Oct. 10, 1933.   E. L. ROSE   1,929,990
RECTILINEAR INDUCTION MOTOR
Filed May 27, 1931
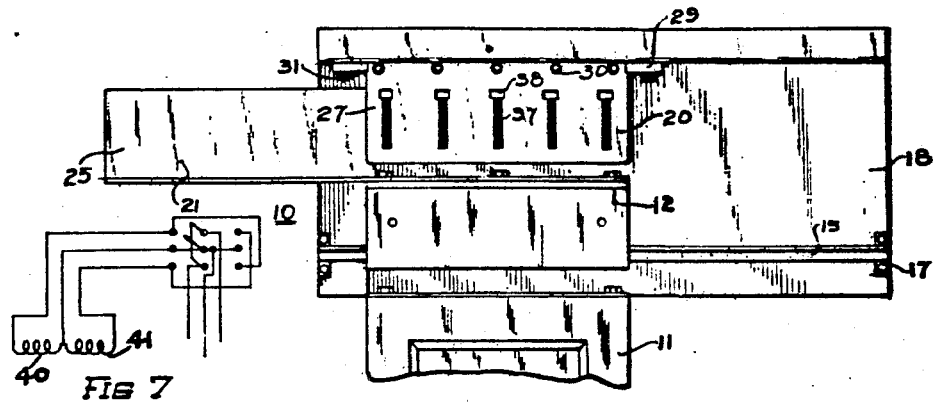
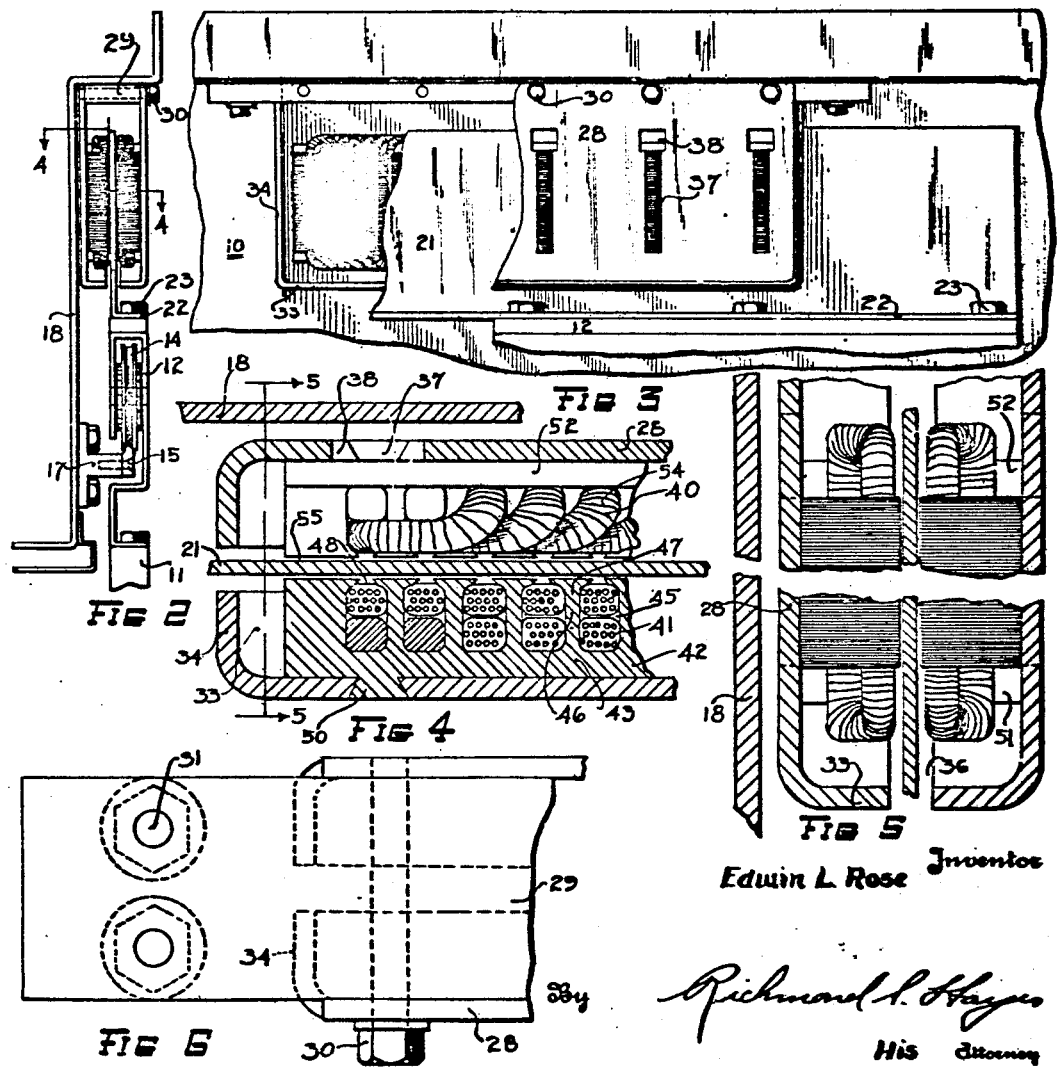
Edwin L. Rose, Inventor
By Richmond L. Hayes
His Attorney Patented Oct. 10, 1933

1,929,990

UNITED STATES PATENT OFFICE 1,929,990

RECTILINEAR INDUCTION MOTOR

Edwin L. Rose, Cambridge, Mass., assignor to Dahlstrom Metallic Door Company, Jamestown, N. Y., a corporation of New York Application May 27, 1931. Serial No. 540,362

14 Claims. (Cl. 172—290)

This invention relates to an improvement in alternating current motors and more particularly to those of the rectilinear type.

The preferred embodiment of this invention provides a motor having a field structure and translator. The field structure is arranged with a central longitudinal opening which spaces apart substantially duplicate elements. The translator lies in the opening between these elements and, being the driven element, may be linked in any convenient and practicable manner to perform a given work.

The principal object of the invention is to provide a rectilinear motor having application to and being adapted to produce a rectilinear driving force for use in connection with many kinds of work.

Another object of the invention is to provide a rectilinear motor having structure adapted to reduce, to a minimum, all noises incident to the operation thereof.

A further object of the invention is to provide a motor of this type, the fixed elements of which are completely enclosed by a supporting structure adapted to prevent physical distortion during operation.

A still further object of the invention is to provide a rectilinear motor having relatively movable elements which may be readily applied to and adapted to actuate a sliding door, one element being mounted on the enclosure and the other element on the door.

Other and further objects of the invention will be more clearly understood from a consideration of the following specification which is taken in conjunction with the accompanying drawing, and in which Fig. 1 is a rear elevation of one modification of this invention applied to and adapted to actuate a sliding door;

Fig. 2 is an enlarged vertical sectional view, taken substantially through the center of Figure 1, showing the door suspension and motor attachment;

Fig. 3 is an enlarged side elevation of the motor, parts being broken away to reveal certain details of the structure thereof;

Fig. 4 is a fragmentary horizontal sectional view of the motor, being taken substantially on the line 4—4 of Figure 2 and shows the method of mounting laminations in the casing as well as the coil arrangement;

Fig. 5 is a vertical sectional view of the motor, being taken substantially on the line 5—5 of Figure 4; and Fig. 6 is a fragmentary plan view showing the method of joining the motor elements together;

Fig. 7 is a diagrammatic showing of a reversing switch that may be used in exciting the motor windings.

Attention is directed to the fact that the drawing discloses a rectilinear induction motor having a field structure which includes two reversely disposed core and coil groups, between which an armature or translator is located. It will be understood that the present invention contemplates the use also of a motor of this type having but one core and coil group, adjacent the proper face of which the armature is located. In other words, each field group acts independently on the armature and consequently elimination of one of the groups merely results in a motor of considerably less efficiency and power. The purpose of this arrangement may be more readily understood by considering the structure in Figure 2 of the drawing wherein the depth of the enclosure structure is sufficient to receive a field structure comprised of two spaced core and coil groups. In building construction it is frequently found necessary to reduce this depth and under such conditions a motor having one or more core and coil groups adjacent only one face of the armature may be satisfactorily utilized.

Referring to the drawing, the invention, generally indicated by the reference numeral 10, is shown mounted for use and adapted to operate a sliding door 11. Attached to the upper edge of the door is a pendent plate 12 in which rollers 14 are located. The rollers 14 are mounted on a track 15 which, through brackets 17, is secured to an enclosure 18.

The motor comprises a field structure 20 and armature or translator 21. The armature is formed with a horizontal flange 22 by which it is secured through bolts 23, to the pendent plate 12. In the present embodiment of the invention, the armature is shown to project beyond one vertical edge of the door a distance approximately the width of said door. The length of the armature, however, is necessarily governed only by the extent of translation required to perform a given work. The vertical portion 25 projects preferably upwardly into a longitudinal slot or opening formed centrally of the field structure and is caused to move in one direction or the other relative to said field structure through influence of the establishment of electro-magnetic forces as will hereinafter be more fully described.

The field structure 20, here shown, comprises a casing 27 in which are mounted two substantially identical spaced field groups. The casing is comprised of two vertical wall elements 28 which are connected along their upper edge by a plate 29, through bolts 30. The plate 29 constitutes the means by which the field structure is supported and, as found convenient in the present instance, the ends thereof are projected slightly beyond the vertical ends of the field structure, being secured to a horizontal flange of the enclosure 18 by bolts 31. The side walls 28 terminate, along their lower edges in inturned flanges 33. The ends of the side walls are likewise terminated by inturned flanges 34. When the side walls are spacedly connected in the manner above described, the adjacent inner edges of flanges 33 and 34 of each of said walls are spaced apart to provide a vertical longitudinally extending slot 36 in the casing. Uniformly spaced vertical slots 37 are made in the walls 28 of the casing. The slots are preferably wedge shaped in cross-section, being terminated at their upper ends in larger rectangular slots 38. These slots are for the purpose of interlocking stacks of laminations with each of the vertical walls 28, as will be more fully described.

In the field structure are duplicate groups which comprise windings 40 and 41 located in cores 42. Since the structural details of each group are identical, only one will be described in detail. The laminated core 42 is comprised of stamped strips 43 which are stacked to obtain the desired height. These strips contain evenly spaced substantially oval shaped slots 45 which are formed by similarly spaced teeth 46. The projections diverge at their ends to form skirts 47, the vertical edges of which constitute pole faces. Horizontally adjacent teeth are separated by a narrow slot 48 which opens into the oval slot 45. The outer vertical edge of each strip is formed with a number of keys 50 corresponding to the number of slots 37 in the casing wall 28. In assembling these strips in the casing a retaining and supporting plate 51 is welded or otherwise suitably joined to the wall 28, the upper edge of said plate being horizontally aligned with the bottom wall of each of the slots 37. The keys 50 of the strips 43 are admitted to the wedge shaped slots 37 through the rectangular slot 38, being dropped in place, one piled on the other until the desired core height is reached. The lowermost strip rests upon the plate 51. To prevent loosening of the stacked strips, an upper plate 52 is provided which rests upon the uppermost strip and is secured to the casing wall 28 in a manner similar to the plate 51. This upper plate prevents dislodgment of the strips 43 as well as constituting a support to said strips should the upright position of the field structure be reversed to that shown in the drawing.

The identical windings 40 and 41 are each comprised of a plurality of coils 54. One vertical edge of the coil adjacent the end of the core is located in and partly fills the first core slot 45. This coil carries over the next adjacent slot and the other vertical edge thereof lies in the third slot 45 from the end. In so far as this coil is concerned, the first two pole faces, although spaced apart by the slot 48 in the core, constitute a single pole. The second coil is mounted with one edge in the second slot 45, the other edge lying in the fourth slot. The third coil is arranged with one edge in the space left unoccupied by the adjacent end of the first coil namely the third slot, the other edge of this coil lying in the fifth slot. This coil arrangement continues in this fashion to the end of the core. In constructing a motor of this type a definite relationship between size of coils, core slots and core depth is established in order that when the elements are assembled they will result in a strong and compact unit of suitable electrical characteristics.

It will be noted that the inner vertical edges of cores 42 approach each other more closely than do the inner edges of the casing flanges 33 and 34. Thus the slot 36, defined by the flanges of the casing, is still further reduced to form a slot 55, defined by the adjacent core edges. The armature 21 is adapted to lie within the slot 55, being moved in one direction or another relative to the field structure by reason of a magnetic force which is set up when the coils are energized from a suitable source of alternating current supply.

Attention is particularly directed to the fact that a motor of this type is capable of producing a considerable driving force and, as is the case with all stationary elements of a rectilinear motor, the field structure must be supported in a manner to prevent any twisting or weaving of the elements thereof during operation. This is particularly true, since the slot 55 through which the armature moves, allows only slight clearance in order that the impelling forces may more efficiently affect the armature. Should the field structure become slightly twisted or out of alignment, the armature would drag when passing therethrough, resulting in wear both on the armature and pole faces and would also produce an undesirable noise. To prevent this twisting, the casing 27 is flanged both at its ends and along the bottom edge. These flanges so rigidify the casing that no appreciable variation in the width of the slot 55 occurs during operation of the motor.

A rectilinear motor of this type, when directly applied as the driving force to operate a sliding door, is best arranged with the field structure, which is generally U-shaped, supported along the base of the U. The reason for this is obvious since the field structure may be likened to a tuning fork which, when vibrations are set up tend to vary the relative gap or space between prongs. Since electrical vibrations set up by passing current through the coils 54 tends to change the width of the slot 55, it becomes evident that a rigid casing in which to spacedly mount these elements is desirable.

While applicant has shown but one modification of his invention for use in connection with the operation of a sliding door, it is obvious to those skilled in the art that other modifications or applications may be made without departing from the spirit and scope of the invention as set forth in the hereunto annexed claims.

Having thus set forth my invention what I claim as new and for which I desire protection by Letters Patent is:

1. A rectilinear induction motor comprising two core elements, walls defining slots in said elements, coils mounted in said slots, keys integral with said core elements, a casing enclosing said elements, receiving means in said casing for said keys, said means retaining said elements in said casing, adjacent faces of said elements defining a longitudinal passageway, walls in said casing defining a longitudinal slot, and a separately supported armature in said passageway and said slot.

2. A casing enclosing the field structure of a rectilinear induction motor comprising two parallel elements, a plate engaged with and connecting adjacent edges of said elements, means terminating the free edges of said elements, said means serving to rigidify said casing and prevent twisting or weaving of the elements of said field structure and said casing during operation of said motor.

3. A rectilinear induction motor having a polyphase field structure and an armature, said field structure being mounted on and secured to a suitable fixed member, said armature being mounted on a movable member, projecting into said field structure and guided for linear motion relative to said fixed member, said armature being dependent for support and maintenance in operative position relative to said field structure upon said movable member and its guiding means.

4. A rectilinear induction motor having a field structure and an armature, said field structure and armature being separately and removably mounted one on each of two relatively movable and relatively guided members, the guides of said members being suitable to maintain said field structure and said armature in operative spaced relationship whereby physical vibration in the elements of said field structure cannot be transmitted to said armature.

5. A rectilinear induction motor comprising a stationary field structure, an armature mounted on a movable supporting member, said armature projecting into a longitudinal opening in said field structure, said supporting member having guide means for maintaining said armature in spaced operative relationship to the walls of the opening in said field structure, and means for energizing said field structure to produce a traveling magnetic field whereby to move said armature and said movable supporting member relative to said field structure.

6. A rectilinear induction motor comprising a pair of oppositely disposed core and coil groups, a casing enclosing said groups, means securing said groups to the walls of said casing, the inner faces of said groups defining an air gap, and further means terminating the free edges of said casing, said further means maintaining the width of said air gap constant throughout its length whereby a separately supported armature may be inserted into said air gap for unimpeded translation relative to said core and coil groups.

7. A rectilinear induction motor comprising a pair of oppositely disposed core and coil groups, a casing enclosing said groups, means securing said groups to the walls of said casing, the inner faces of said groups defining an air gap, inturned flanges terminating the free edges of said casing, said flanges maintaining the width of said air gap constant throughout the length of said core and coil groups whereby a separately supported armature may be inserted into said air gap for unimpeded translation relative to said core and coil groups.

8. A rectilinear induction motor comprising a pair of spaced oppositely disposed core and coil groups, a casing enclosing said groups having a series of vertical slots, means on said core groups interlocking with the walls of said slots to prevent lateral displacement of said core groups relative to said casing, and further means for securing said core group means against vertical displacement from said casing slots.

9. A rectilinear induction motor comprising a pair of spaced oppositely disposed core and coil groups, a casing enclosing said groups having a series of vertical slots in the vertical walls thereof, and means on said core groups interlocking with the walls of said slots to prevent lateral displacement of said core groups relative to said casing.

10. A rectilinear induction motor comprising a pair of spaced oppositely disposed core and coil groups, a casing enclosing said groups having a series of vertical slots in certain of the walls thereof, a plurality of keys on each of said groups, said keys projecting into and engaging the walls of said slots to secure said groups against lateral displacement relative to said casing.

11. In a rectilinear induction motor having coil and core groups, a casing enclosing said groups having a series of vertical slots, the walls of said slots converging toward the inner walls of said casing, keys formed integral with said cores, said keys having enlarged ends engageable with the converging walls of said slots to secure said core groups against lateral displacement relative to said casing.

12. In a rectilinear induction motor having core and coil groups, a casing enclosing said groups having a series of vertical slots, the walls of each of said slots converging toward the inner wall of said casing, keys on said core groups having a contour conforming to that of said casing slots, said keys being engageable with the walls of said slots to prevent lateral displacement of said core groups relative to said casing, and means for securing said keys against vertical displacement from said slots.

13. A casing, enclosing and supporting the field structure of a rectilinear induction motor, comprising a pair of spaced parallel elements, means connecting one pair of corresponding edges of said elements, flanges terminating the free edges of said elements, the flanges of one element being in aligned proximity with the corresponding flanges of the other element, said flanges together forming a slot for the entry of a translatable armature into said casing.

14. A casing, enclosing and supporting the field structure of a rectilinear induction motor, comprising a pair of spaced parallel elements, means connecting one pair of corresponding edges of said elements, further means terminating the free edges of each of said elements, the further means of one element cooperating with the further means of the other element to enclose one side and the ends of said casing and together form a slot for the entry of a translatable armature into said casing.

EDWIN L. ROSE.